(12) United States Patent
Rose et al.

(10) Patent No.: US 8,205,335 B2
(45) Date of Patent: Jun. 26, 2012

(54) METHOD OF REPAIRING KNIFE EDGE SEALS

(75) Inventors: William M. Rose, Warren, MA (US); Robert A. Charbonneau, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 1414 days.

(21) Appl. No.: 11/811,701

(22) Filed: Jun. 12, 2007

(65) Prior Publication Data

US 2009/0324395 A1    Dec. 31, 2009

(51) Int. Cl.
   B23P 6/00      (2006.01)
   F01D 25/24    (2006.01)

(52) U.S. Cl. .............. 29/889.1; 29/402.02; 29/402.08; 415/173.7

(58) Field of Classification Search .............. 29/889.1, 29/402.02, 402.07, 402.08, 517; 415/173.7
   See application file for complete search history.

(56) References Cited

U.S. PATENT DOCUMENTS

| | | |
|---|---|---|
| 3,771,798 A | 11/1973 | McDonald et al. |
| 3,846,899 A | 11/1974 | Gross |
| 4,028,788 A | 6/1977 | DeMusis |
| 4,257,617 A | 3/1981 | Hill |
| 4,257,735 A | 3/1981 | Bradley et al. |
| 4,285,108 A | 8/1981 | Arrigoni |
| 4,351,532 A | 9/1982 | Laverty |
| 4,449,714 A | 5/1984 | Meier |
| 4,526,508 A | 7/1985 | Antonellis |
| 4,574,619 A | 3/1986 | Castellant et al. |
| 4,606,102 A | 8/1986 | Riethmuller |
| 4,657,171 A | 4/1987 | Robins |
| 4,767,267 A * | 8/1988 | Salt et al. .................. 415/173.7 |
| 4,825,029 A | 4/1989 | Otto |
| 4,924,581 A | 5/1990 | Jakobsen |
| 5,630,590 A | 5/1997 | Bouchard et al. |
| 6,422,815 B1 | 7/2002 | Marler et al. |
| 7,850,173 B2 * | 12/2010 | Ivakitch ....................... 277/421 |
| 2006/0275106 A1 | 12/2006 | Alvanos |
| 2006/0275107 A1 | 12/2006 | Alvanos |

FOREIGN PATENT DOCUMENTS

GB     2159895 A     12/1985

OTHER PUBLICATIONS

Official Search Report of the European Patent Office in counterpart foreign Application No. 08251862.2 filed May 29, 2008.

* cited by examiner

*Primary Examiner* — Alexander P Taousakis
(74) *Attorney, Agent, or Firm* — Kinney & Lange, P.A.

(57) ABSTRACT

A method of repairing a gas turbine knife edge seal assembly in which assembly is included a used honeycomb ring seal and a knife edge. The method includes removing the used honeycomb ring seal, removing material from the knife edge to a first knife edge radial height, installing a replacement honeycomb ring seal with a stock radial thickness, and removing material from the replacement honeycomb ring seal to a finished radial thickness for sealable engagement with the knife edge. The finished radial thickness of the replacement honeycomb ring seal establishes a first radial gap between an inner annular surface of the replacement honeycomb ring seal and the knife edge before the knife edge seal assembly begins rotating in the gas turbine.

13 Claims, 7 Drawing Sheets

METHOD OF REPAIRING KNIFE EDGE SEALS

BACKGROUND

Rotary seals, which include rotating members in sealable engagement with one another, are frequently used in various parts of gas turbine engines. The purpose of such rotary seals is to prevent fluid, such as air, in a gas turbine chamber at one pressure from passing to a chamber at a different pressure. Knife edge seal assemblies are one variety of rotary seal employed in gas turbine engines. Knife edge seal assemblies typically include a disk with an integral flange with one or more radial projections, known as "knife edges," and a honeycomb ring seal attached to a guide vane. The disk and knife edge rotate with other components of the gas turbine, while the guide vane and honeycomb ring seal are stationary. The knife edge and honeycomb ring seal are assembled relative to each other to leave a small radial gap between the top of the knife edge and the inner surface of the honeycomb ring seal before the knife edge begins rotating in the gas turbine. Once the gas turbine begins operating, the centrifugal force created by the rotational speed of the gas turbine and the mass of the knife edge closes the gap between the knife edge and honeycomb ring seal and causes the knife edge to cut into and seal with the honeycomb ring seal.

Knife edges frequently develop defects or are otherwise worn during operation in a gas turbine. The operational wear on knife edges necessitates repairing the seal assembly at intervals during the lifetime of a typical gas turbine engine. The radial gap between the knife edge and honeycomb ring seal is critical to the effectiveness of the rotating seal. Maintaining this gap during repair cycles of knife edge seal assemblies, to some extent, defines the bounds of satisfactory methods of repair. The radial gap between the knife edge and honeycomb ring seal is a function of the radial height of the knife edge and the radial thickness of the honeycomb ring seal. Honeycomb ring seals are commonly purchased with standard dimensions and then machined to finished dimensions appropriate for their intended application. Therefore, maintaining the radial gap between the knife edge and honeycomb ring seal is primarily a function of manipulating the radial height of the knife edge. Prior methods of repairing knife edges typically include adding material to the top of the knife edge and then grinding the added material to a finished radial height. However, these methods of repair have two primary disadvantages. First, the step of adding material to the worn knife edges typically involves heating the knife edge material and thereby heating the material surrounding the knife edge, for example, by welding additional material onto the knife edge. In that case, there is a risk that the heating will create deleterious effects to the part on which the knife edges are located, for example by creating thermo-mechanical stresses in the part. The second disadvantage of prior methods is that the means of adding material to the knife edge is dependent on the knife edge material and this dependency can complicate the method significantly. For example, high strength metals, such as Nickel alloys, are very difficult to weld and therefore may preclude some methods of repair that require adding material to the knife edge.

SUMMARY

The present invention includes a method of repairing a gas turbine knife edge seal assembly in which assembly is included a used honeycomb ring seal and a knife edge. The method includes removing the used honeycomb ring seal, removing material from the knife edge to a first knife edge radial height, installing a replacement honeycomb ring seal with a stock radial thickness, removing material from the replacement honeycomb ring seal to a finished radial thickness for sealable engagement with the knife edge. The finished radial thickness establishes a first radial gap between an inner annular surface of the replacement honeycomb ring seal and the knife edge before the knife edge begins rotating in the gas turbine.

The present invention may also be adapted to an alternative embodiment of repairing a knife edge seal assembly, which assembly includes a used honeycomb ring seal and a knife edge that is circumferentially divided into interleaved segments with a first series of knife edge segments integral with disk flanges integral with a radially outward portion of a rotor disk and a second series of knife edge segments integral with blade flanges integral with a plurality of turbine blades assembled in the rotor disk. This embodiment includes removing the used honeycomb ring seal, shimming the turbine blades assembled in the rotor disk, removing material from the knife edge to a first knife edge radial height, installing a replacement honeycomb ring seal with a stock radial thickness, and removing material from the replacement honeycomb ring seal to a finished radial thickness for sealable engagement with the knife edge. Shimming the turbine blades assembled in the rotor disk simulates a centrifugal force on the turbine blades when the rotor disk is rotating. The finished radial thickness of the replacement honeycomb ring seal establishes a first radial gap between an inner annular surface of the replacement honeycomb ring seal and the knife edge before the knife edge seal assembly begins rotating in the gas turbine.

DETAILED DESCRIPTION

Figure 1A:
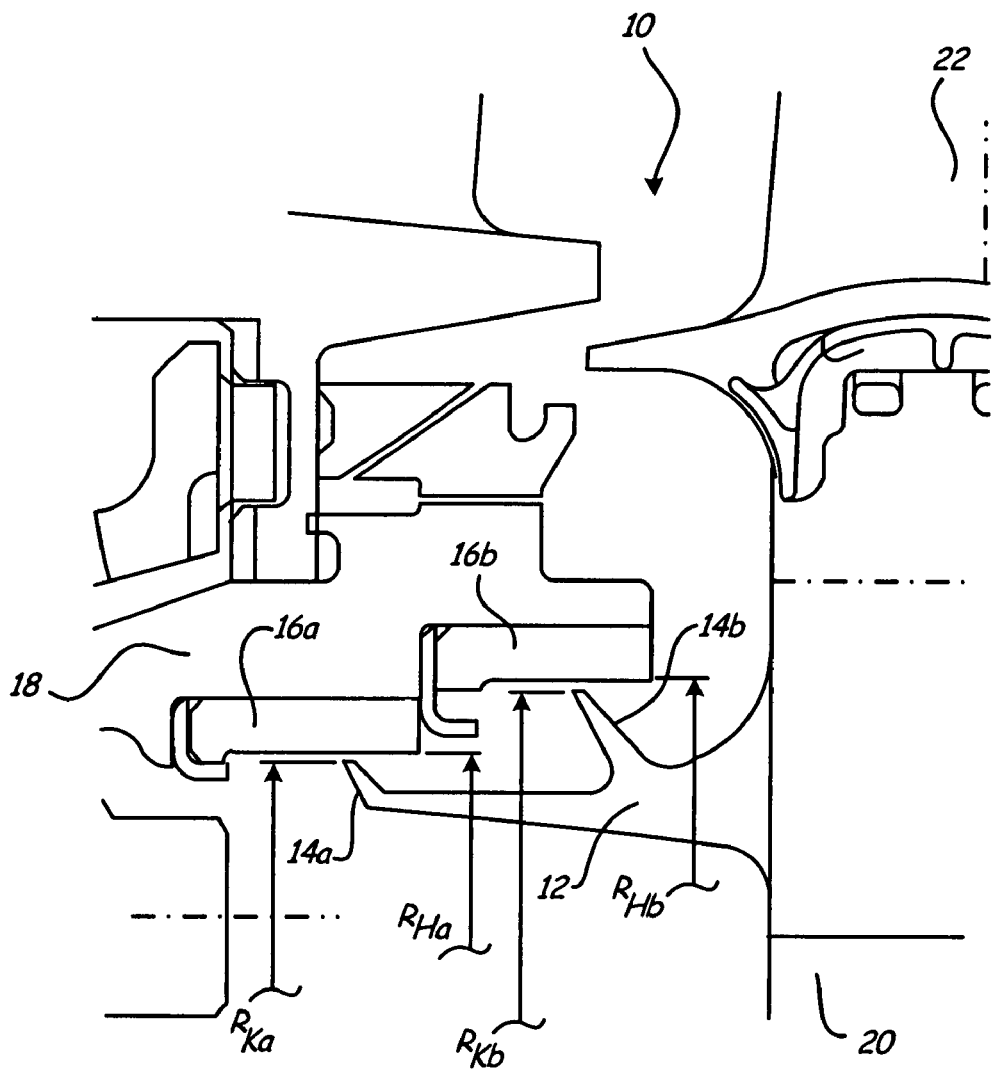
FIG. 1A shows a detail side view of a knife edge seal assembly.
Figure 1B:
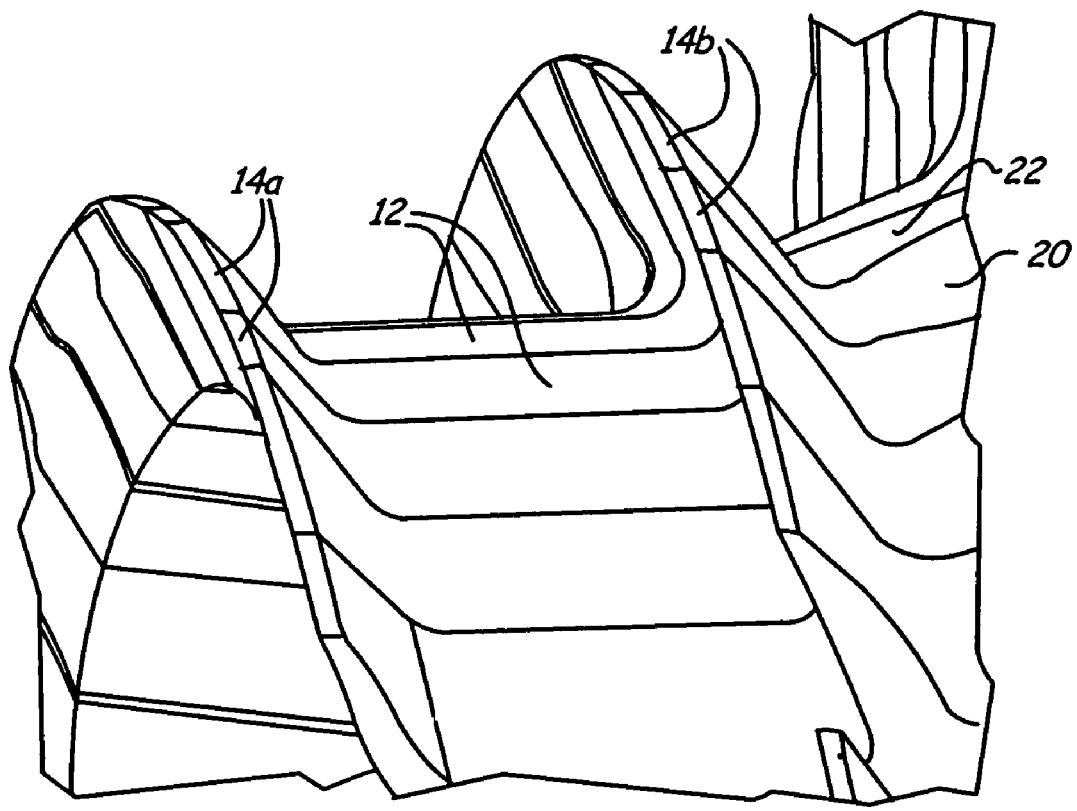
FIG. 1B shows a detail perspective view of the knife edges of FIG. 1A.

FIG. 1A shows a detail side view of knife edge seal assembly 10, which includes flange 12, knife edges 14a, 14b, honeycomb ring seals 16a, 16b, guide vane 18, rotor disk 20, and turbine blade 22 assembled in rotor disk 20. Knife edges 14a, 14b are integral with flange 12 and have radial heights $R_{Ka}$, $R_{Kb}$, respectively. FIG. 1B shows a detail perspective view of knife edges 14a, 14b integral with flange 12, which includes circumferential interleaved segments alternatively integral with rotor disk 20 and turbine blade 22. In FIG. 1A, honeycomb ring seals 16a, 16b are attached to guide vane 18 and have radial heights $R_{Ha}$, $R_{Hb}$ respectively. In knife edge seal assembly 10, knife edges 14a, 14b rotate with rotor disk 20 and turbine blade 22, while guide vane 18 and seals 16a, 16b remain stationary. Knife edges 14a, 14b and honeycomb ring seals 16a, 16b are assembled relative to each other to leave a small radial gap between the top of knife edges 14a, 14b and the inner surface of honeycomb ring seals 16a, 16b before knife edges 14a, 14b begin rotating in the gas turbine. In FIG. 1A, the radial gap between knife edge 14a and honeycomb ring seal 16a is equal to $R_{Ha}-R_{Ka}$. The radial gap between knife edge 14b and honeycomb ring seal 16b is equal to $R_{Hb}-R_{Kb}$. Once the gas turbine begins operating, the centrifugal force created by the rotational speed of the gas turbine and the mass of knife edges 14a, 14b closes the gap between knife edges 14a, 14b and honeycomb ring seals 16a, 16b and causes knife edges 14a, 14b to cut into and seal with honeycomb ring seals 16a, 16b.

Figure 2:
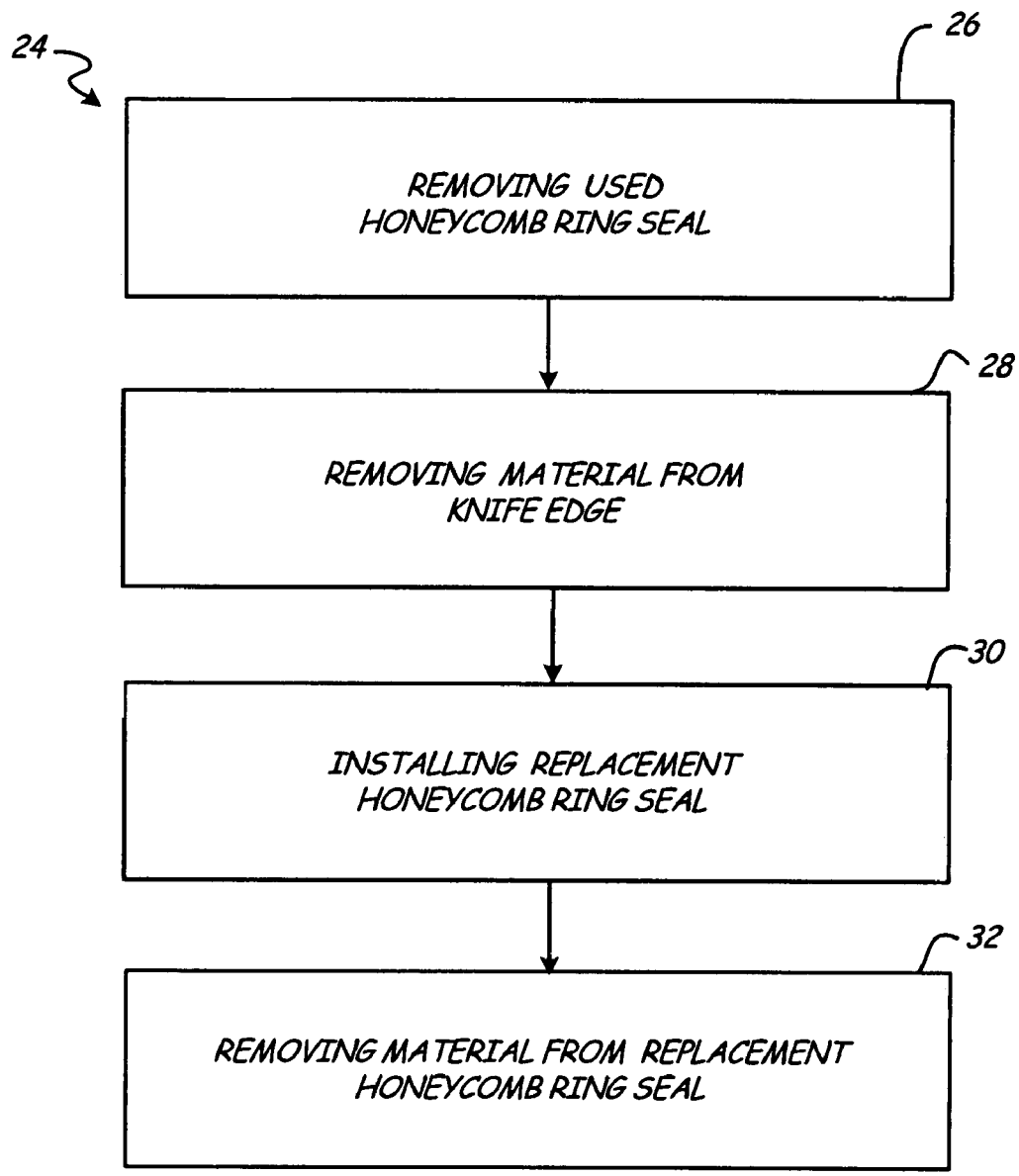
FIG. 2 shows a flow diagram of a method according to the present invention.

Knife edges frequently develop defects during operation in a gas turbine. Operational wear on the knife edges necessitates repairing the seal assembly at intervals during the lifetime of a typical gas turbine engine. FIG. 2 shows method 24 of repairing a knife edge seal assembly having a used honeycomb ring seal and a knife edge, which method includes removing a used honeycomb ring seal (step 26), removing material from a knife edge to a first knife edge radial height (step 28), installing a replacement honeycomb ring seal with a stock radial thickness (step 30), and removing material from the replacement honeycomb ring seal to a finished radial thickness for sealable engagement with the knife edge (step 32).

Removing the used honeycomb ring seal (step 26) may be accomplished, for example, by separating the seal from the guide vane to which it is attached or by completely grinding away the remaining seal material from the guide vane. After removing the first honeycomb ring seal (step 26), material is removed from the knife edge to a first knife edge radial height (step 28). Removing material from the knife edge (step 28) may be accomplished by grinding the knife edge to a particular radial height. In some embodiments, removing material from the knife edge (step 28) is accomplished by rotor grinding in which case the knife edge is ground while rotating. Rotor grinding ensures the finished knife edge has a uniform radial height along its circumference.

After removing material from the knife edge (step 28), a replacement honeycomb ring seal is installed with a stock radial thickness (step 30). The replacement honeycomb ring seal can be installed by a number of techniques known to persons having ordinary skill in the art. For example, the seal can be installed by tack welding, followed by furnace brazing to attach the seal to the guide vane (an example honeycomb ring seal and guide vane is shown in FIG. 1A). After installing the replacement honeycomb ring seal (step 30), material is removed from the seal to a finished radial thickness (step 32). The finished radial thickness of the replacement honeycomb ring seal establishes a radial gap between the knife edge and the replacement honeycomb ring seal. The radial gap is a function of the radial height of the knife edge and the radial height of the inner surface of the replacement honeycomb ring seal (which depends on the seal thickness), or as illustrated in FIG. 1A, the radial gap is equal to $R_H-R_K$.

Although the method of knife edge repair described above and illustrated in FIG. 2 includes the repair of a single knife edge, methods according to the present invention may be applied to multiple knife edges in a single knife edge seal assembly or across multiple knife edge seal assemblies.

In knife edge seal assembly 10 shown in FIGS. 1A and 1B, the disk and blade materials, and operational requirements, make adding material to the knife edges either impracticable or susceptible to deleterious thermo-mechanical effects on the disk or blades. In this particular arrangement, the knife edges are originally designed to a radial height that allows for subsequent material removal, while simultaneously maintaining an operational radial gap between the knife edge and a honeycomb ring seal with a finished radial thickness.

Figure 3:
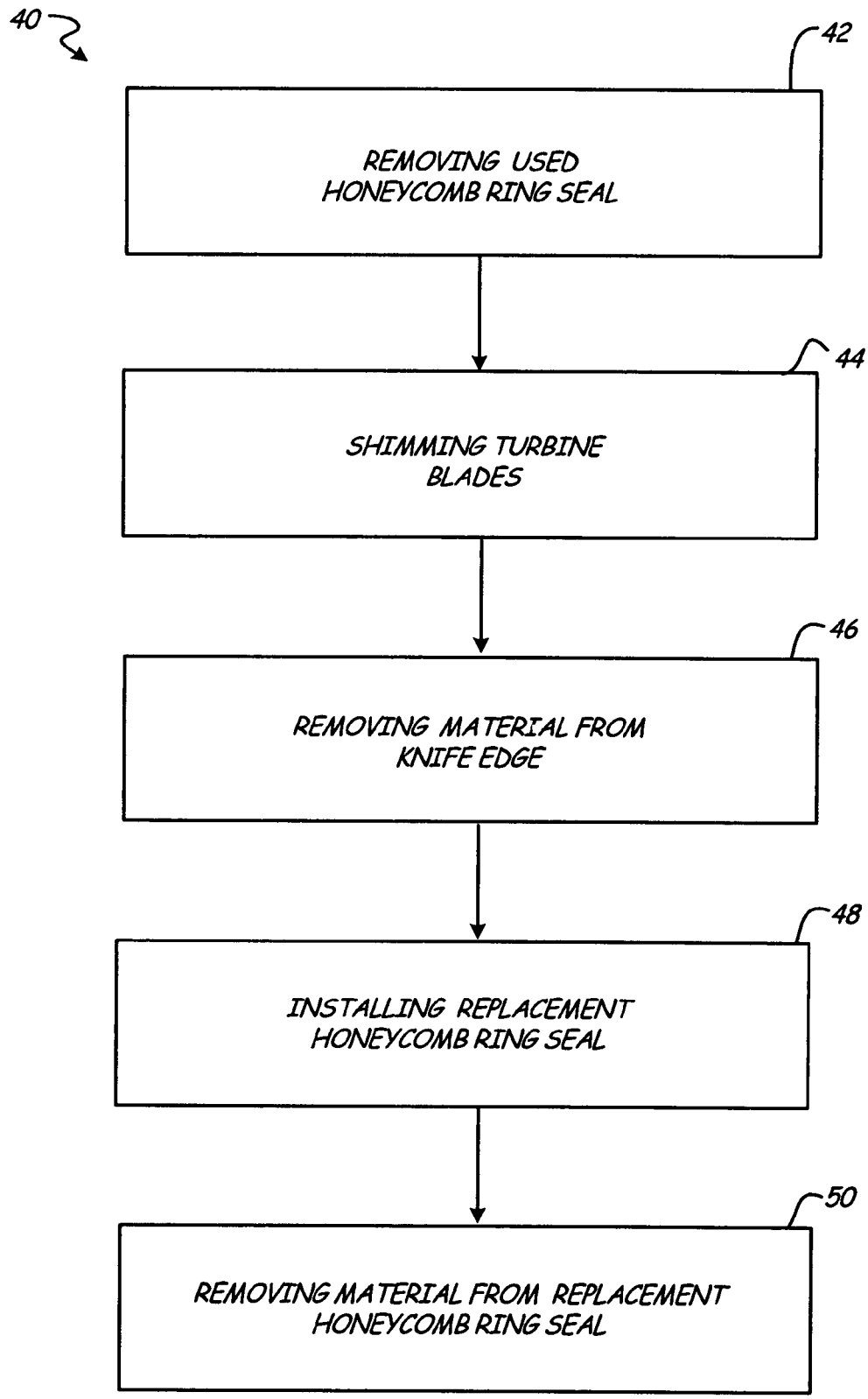
FIG. 3 shows a flow diagram of an alternative method according to the present invention.

FIG. 3 shows alternative method 40 of repairing a knife edge assembly having a used honeycomb ring seal and a knife edge, which method includes removing a used honeycomb ring seal (step 42), shimming turbine blades assembled in a rotor disk (step 44), removing material from a knife edge to a first knife edge radial height (step 46), installing a replacement honeycomb ring seal with a stock radial thickness (step 48), and removing material from the replacement honeycomb ring seal to a finished radial thickness for sealable engagement with the knife edge (step 50). The knife edge being repaired in method 40 is circumferentially divided into interleaved segments with a first series of knife edge segments integral with disk flanges integral with a radially outward portion of the rotor disk and a second series of knife edge segments integral with blade flanges integral with the turbine blades assembled in the rotor disk. Method 40 begins by removing the used honeycomb ring seal from the seal assembly (step 42). Removing the used honeycomb ring seal (step 42) may be accomplished, for example, by separating the seal from the guide vane to which it is attached or by completely grinding away the remaining seal material from the guide vane. After removing the used honeycomb ring seal (step 42), the turbine blades assembled in the rotor disk are shimmed (step 44) to simulate a centrifugal force on the turbine blades when the rotor disk is rotating. Shimming the turbine blades (step 44) is meant to arrange the blades in substantially the same position, relative to the rotor disk, the blades would be in during rotation of the disk in the gas turbine. Shimming the turbine blades (step 44) pushes the blades radially outward, which simulates the centrifugal force on the blades during rotation and thereby properly arranges the knife edge segments integral with the blades for material removal.

After shimming the turbine blades (step 44), material is removed from the knife edge (step 46). Removing material from the knife edge (step 46) may be accomplished by grinding the knife edge to a particular radial height, for example, by rotor grinding in which the knife edge is ground while rotating. After removing material from the knife edge (step 46), a replacement honeycomb ring seal is installed with a stock radial thickness (step 48). The replacement honeycomb ring seal can be installed by a number of techniques known to persons having ordinary skill in the art. For example, the seal can be installed by tack welding, followed by furnace brazing to attach the seal to the guide vane. After installing the replacement honeycomb ring seal (step 48), material is removed from the seal to a finished radial thickness (step 50). The finished radial thickness of the replacement honeycomb ring seal establishes a radial gap between the knife edge and the replacement honeycomb ring seal. The radial gap is a function of the radial height of the knife edge and the radial height of the inner surface of the replacement honeycomb ring seal (which depends on the seal thickness), or as illustrated in FIG. 1A, the radial gap is equal to $R_H-R_K$.

Although the method of knife edge repair described above and illustrated in FIG. 3 includes the repair of a single knife edge, methods according to the present invention may be applied to multiple knife edges in a single knife edge seal assembly or across multiple knife edge seal assemblies. For example, the method illustrated in FIG. 3 may be applied to the knife edge seal assembly shown in FIGS. 1A and 1B where two knife edges are integral with a flange which includes circumferential interleaved segments alternatively integral with a rotor disk and a turbine blade.

Figure 4A:
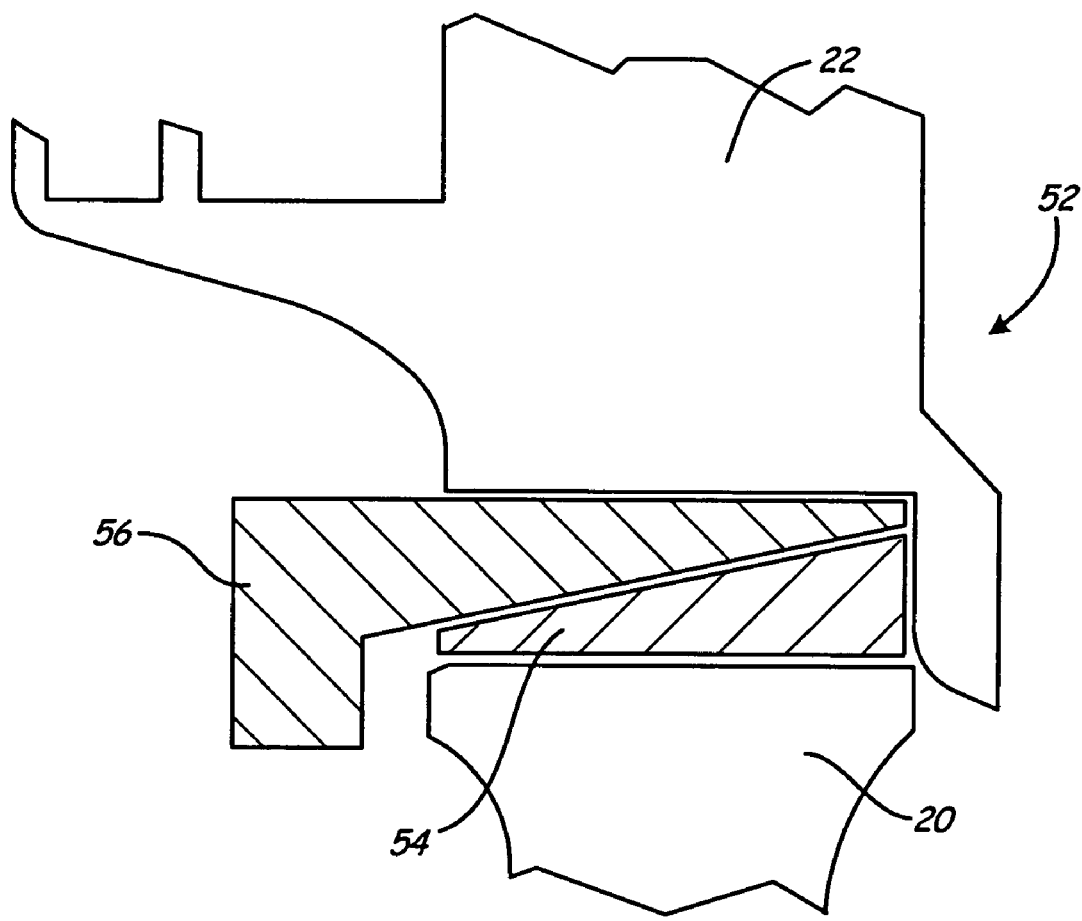
FIGS. 4A and 4B show a gas turbine rotor assembly with a shimmed turbine blade.
Figure 4B:
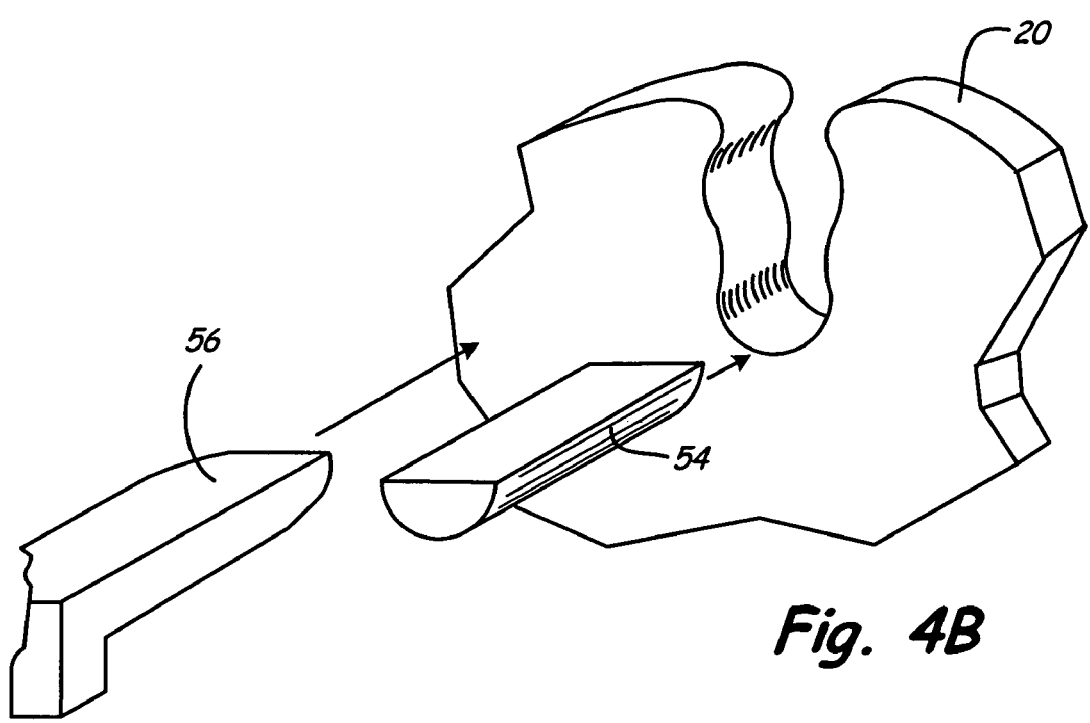

FIGS. 4A and 4B shows gas turbine rotor assembly 52, which includes rotor disk 20, turbine blade 22, first shimming wedge 54, and second shimming wedge 56. Turbine blade 22 is assembled in rotor disk 20, leaving a space between the root of blade 22 and a slot in disk 20. First shimming wedge 54 has a tapered top surface and is arranged below the root of blade 22 in the slot in disk 20. Second shimming wedge 56 has a tapered bottom surface, which surface is arranged on top of first shimming wedge 54. As the bottom tapered surface of wedge 56 slides across the top tapered surface of wedge 54 in the direction indicated in FIG. 4B, the top of wedge 56 exerts a force on the root of turbine blade 22.

Figure 5:
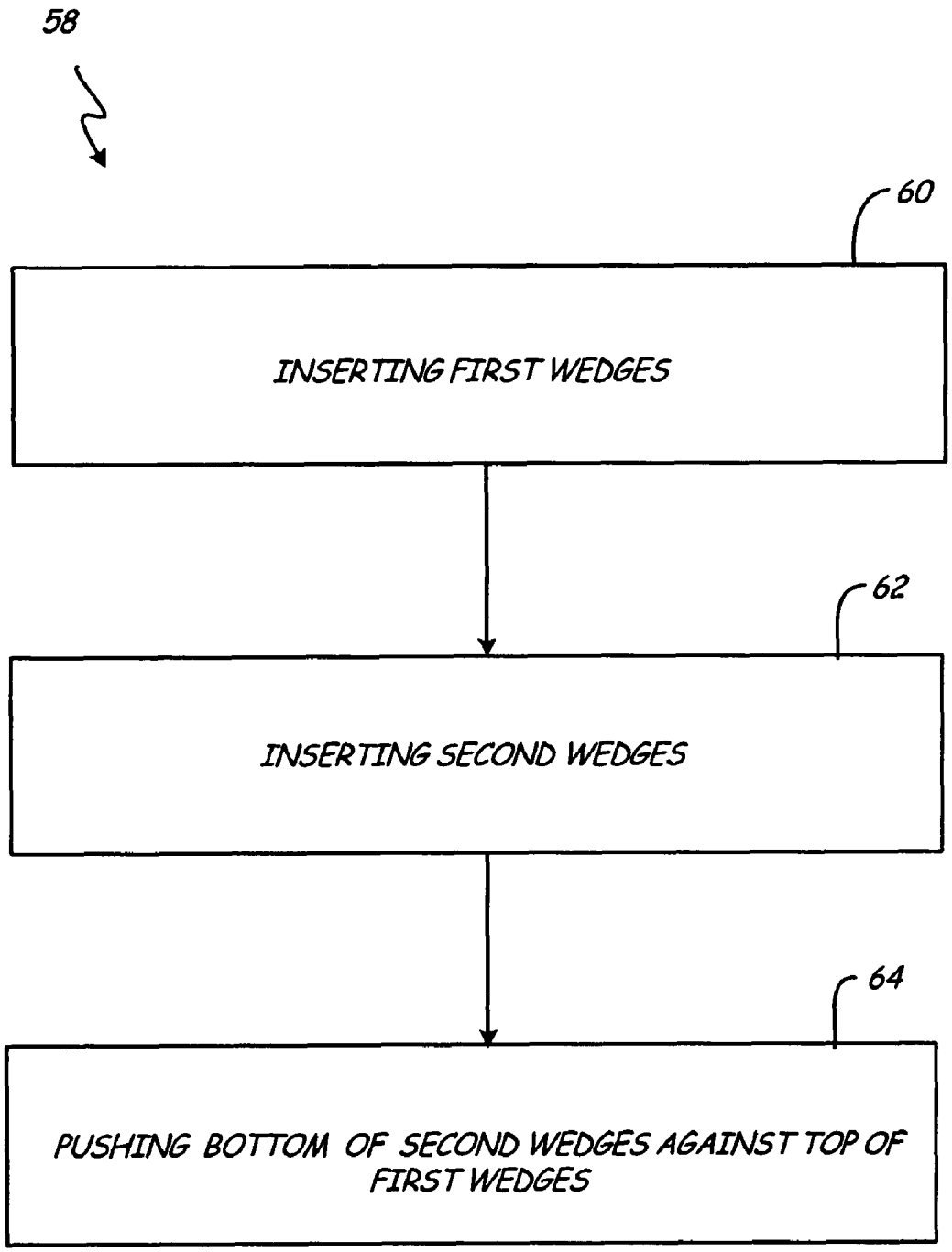
FIG. 5 shows a flow diagram of an example of the shimming process from the exemplary method shown in FIG. 3.

FIG. 5 shows an example shimming process 58 including inserting first wedges 54 under turbine blades 22 assembled in rotor disk 20 (step 60), inserting second wedges 56 on top of first wedges 54 (step 62), and pushing the bottom of second wedges 56 against the top of first wedges 54 to exert a force on turbine blades 22 by the top of second wedges 56 (step 64). First wedges 54 have tapered top surfaces. Second wedges 56 have tapered bottom surfaces. After inserting first wedges 54 under turbine blades 22 assembled in rotor disk 20 (step 60), second wedges 56 are inserted on top of first wedges 54 (step 62) to arrange the bottom tapered surfaces of second wedges 56 in opposing sliding contact with the top tapered surfaces of first wedges 54. After inserting second wedges 56 on top of first wedges 54 (step 62), the bottom surfaces of second wedges 56 are pushed against the top surfaces of first wedges 54 (step 64) until the force exerted on turbine blades 22 by the top of second wedges 56 simulates the centrifugal force on turbine blades 22 when rotor disk 20 is rotating.

Methods of repairing knife edge seal assemblies according to the present invention have several advantages over prior methods of repair. Methods according to the present invention completely remove the step of adding material to the knife edge during repair. Removing the step of adding material to the knife edge reduces the dependency between the method of repair and the knife edge material and therefore expands the applicability of the method on different gas turbine parts including knife edges. Furthermore, there is a reduced risk that the repair method will cause undesirable thermo-mechanical effects on the part on which the knife edge is located.

Although the present invention has been described with reference to preferred embodiments, workers skilled in the art will recognize that changes may be made in form and detail without departing from the spirit and scope of the invention.

The invention claimed is:

1. A method of repairing a gas turbine knife edge seal assembly comprising a used honeycomb ring seal and a knife edge, the method comprising:
   removing the used honeycomb ring seal;
   removing material from the knife edge to a first knife edge radial height, wherein the knife edge is circumferentially divided into interleaved segments with a first series of knife edge segments integral with disk flanges integral with a radially outward portion of a rotor disk and a second series of knife edge segments integral with blade flanges integral with a plurality of turbine blades assembled in the rotor disk;
   installing a replacement honeycomb ring seal with a stock radial thickness;
   removing material from the replacement honeycomb ring seal to a finished radial thickness for sealable engagement with the knife edge, wherein the finished radial thickness establishes a first radial gap between an inner annular surface of the replacement honeycomb ring seal and the knife edge before the knife edge begins rotating in the gas turbine; and
   shimming the turbine blades assembled in the rotor disk after the step of removing the used honeycomb ring seal and before the step of removing material from the knife edge, wherein the shimming step simulates a centrifugal force on the turbine blades when the rotor disk is rotating.

2. The method of claim 1, wherein the step of removing material from the knife edge is accomplished by rotor grinding.

3. The method of claim 1, wherein the shimming step further comprises:
   inserting first wedges with tapered top surfaces under the turbine blades assembled in the rotor disk;
   inserting second wedges with tapered bottom surfaces on top of the first wedges, wherein the bottom tapered surfaces of the second wedges are arranged in opposing sliding contact with the top tapered surfaces of the first wedges; and
   pushing the bottom surfaces of the second wedges against the top surfaces of the first wedges until the force exerted on the turbine blades by the top of the second wedges simulates the centrifugal force on the turbine blades when the rotor disk is rotating.

4. The method of claim 3, wherein the step of removing material from the knife edge is accomplished by rotor grinding.

5. The method of claim 1, wherein the used honeycomb ring seal has a thickness less than an original thickness of the used honeycomb ring seal before it was ever used, and wherein the finished radial thickness of the replacement honeycomb ring seal is greater than the original thickness of the used honeycomb ring seal.

6. The method of claim 1, wherein installing the replacement honeycomb ring seal comprises welding and brazing the replacement honeycomb ring seal to a stator.

7. A method of repairing a gas turbine knife edge seal assembly comprising a used honeycomb ring seal and a knife edge, the method comprising:
   removing the used honeycomb ring seal;
   removing material from the knife edge to a first knife edge radial height, wherein the knife edge is circumferentially divided into interleaved segments with a first series of knife edge segments integral with disk flanges integral with a radially outward portion of a rotor disk and a second series of knife edge segments integral with blade flanges integral with a plurality of turbine blades assembled in the rotor disk;
   installing a replacement honeycomb ring seal with a stock radial thickness sufficient to allow material removal from the replacement honeycomb ring seal to a finished radial thickness;
   removing material from the replacement honeycomb ring seal to the finished radial thickness for sealable engagement with the knife edge, wherein the finished radial thickness establishes a first radial gap between an inner annular surface of the replacement honeycomb ring seal and the knife edge before the knife edge begins rotating in the gas turbine; and
   shimming the turbine blades assembled in the rotor disk after the step of removing the used honeycomb ring seal and before the step of removing material from the knife edge, wherein the shimming step simulates a centrifugal force on the turbine blades when the rotor disk is rotating.

8. The method of claim 7, wherein the step of removing material from the knife edge is accomplished by rotor grinding.

9. The method of claim 7, wherein the shimming step further comprises:

inserting first wedges with tapered top surfaces under the turbine blades assembled in the rotor disk;

inserting second wedges with tapered bottom surfaces on top of the first wedges, wherein the bottom tapered surfaces of the second wedges are arranged in opposing sliding contact with the top tapered surfaces of the first wedges; and pushing the bottom surfaces of the second wedges against the top surfaces of the first wedges until the force exerted on the turbine blades by the top of the second wedges simulates the centrifugal force on the turbine blades when the rotor disk is rotating.

10. The method of claim 9, wherein the step of removing material from the knife edge is accomplished by rotor grinding.

11. The method of claim 7, wherein installing the replacement honeycomb ring seal comprises welding and brazing the replacement honeycomb ring seal to a stator.

12. The method of claim 7, wherein welding the replacement honeycomb ring seal to the stator comprises tack welding the replacement honeycomb ring seal to the stator.

13. The method of claim 7, wherein the used honeycomb ring seal has a thickness less than an original thickness of the used honeycomb ring seal before it was ever used, and wherein the finished radial thickness of the replacement honeycomb ring seal is greater than the original thickness of the used honeycomb ring seal.

* * * * *